(12) United States Patent
Wideman (10) Patent No.: US 8,898,240 B2
(45) Date of Patent: Nov. 25, 2014

(54) MESSAGING POLICY CONTROLLED EMAIL DE-DUPLICATION

(76) Inventor: Roderick B. Wideman, Shakopee, MN (US)

( * ) Notice: Subject to any disclaimer, the term of this patent is extended or adjusted under 35 U.S.C. 154(b) by 75 days.

(21) Appl. No.: 13/210,590

(22) Filed: Aug. 16, 2011

(65) Prior Publication Data

US 2013/0046832 A1 Feb. 21, 2013

(51) Int. Cl.
*G06F 15/16* (2006.01)
*H04L 12/58* (2006.01)

(52) U.S. Cl.
CPC .................... *H04L 51/12* (2013.01)
USPC ........... 709/206; 709/203; 709/223; 713/175; 713/176

(58) Field of Classification Search
USPC ............ 709/203, 206, 223; 713/175–176
See application file for complete search history.

(56) References Cited

U.S. PATENT DOCUMENTS

| | | | |
|---|---|---|---|
| 7,590,693 B1 * | 9/2009 | Chan et al. | 709/206 |
| 2004/0148330 A1 * | 7/2004 | Alspector et al. | 709/200 |
| 2007/0198275 A1 * | 8/2007 | Malden et al. | 705/1 |
| 2007/0282956 A1 * | 12/2007 | Staats | 709/206 |
| 2009/0204903 A1 * | 8/2009 | Edelen et al. | 715/752 |
| 2011/0035453 A1 * | 2/2011 | Koul et al. | 709/206 |
| 2011/0246741 A1 * | 10/2011 | Raymond et al. | 711/170 |

* cited by examiner

*Primary Examiner* — Hitesh Patel (57) ABSTRACT

Example methods and apparatus associated with a messaging policy controlled email deduplication are provided. In one example a messaging policy is accessed. It is determined whether a received message complies with the policy based on rules of the messaging policy. If a message complies with the messaging policy, the message is displayed. If the message does not comply with the messaging policy, it is determined whether the message is duplicative. If the message is deemed duplicative it is not displayed. Conversely, if the message is not deemed duplicative it is displayed.

17 Claims, 4 Drawing Sheets

MESSAGING POLICY CONTROLLED EMAIL DE-DUPLICATION

BACKGROUND

Electronic messaging has become a prevalent means of communication. Electronic messaging is specifically advantageous for mass communication because one message can be sent to a large group of users. Users who receive the message may then reply by sending a response to the originator of the message as well as to other users in the group. If even a small portion of users reply to the original message, the volume of email messages resulting from the original message is greatly increased. Moreover, as users begin to reply to the responses to the original message, the total volume of messages may increase exponentially.

Electronic messaging applications may enable message threading to aid users in organizing messages. Message threading is an association of related messages. Typically, an email message thread consists of an original message and a series of replies sent between users in a group pertaining to the original message. However, as the volume of messages increases, the number of messages in a thread may become unwieldy. Consequently, messages in the message thread may evolve away or even veer from the original topic.

The amount of information in messages may also become progressively duplicative. As the users respond to the original messages and reply messages, more and more duplicative information may be included in replies as the replies include text and data from early messages. Therefore, as the volume of messages increases so does the amount of information in the messages even though the incremental information addition may drop. Accordingly, an electronic message thread may contain a vast number of possibly unrelated messages with increasingly duplicative information.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example apparatus and methods perform messaging policy controlled de-duplication for messaging applications that employ threading organization. A messaging application may be an email or forum application that maintains messages in threads. Various types of applications provide threading capability to messaging. Example apparatus and methods employ a messaging policy having rules and deduplication to reduce the amount of unrelated or redundant information displayed in message threads.

The messaging policy affects how messages in a message thread are displayed. The rules of the messaging policy may be used to determine what data, if any, is unrelated or redundant in the message thread. To do this the messaging policy contains at least one rule that qualifies a message to be displayed or disqualifies a message from being displayed. For example, a user may consider the original message or most recent message to be relevant and use a rule to ensure that the original message and the most recent message are displayed. In one embodiment, a rule may dictate that the original message in the message thread is to be displayed or that the most recent message in the message thread be displayed. The number and scope of the rules is configurable. In various embodiments, rules may have exceptions, be dependent on other rules, or be ranked.

In one embodiment, different rules in the messaging policy are ranked differently. A predominant rule may counteract a rule that is deemed secondary to the predominant rule. For example, the messaging policy may dictate that a message not be displayed if it is determined that the message is 90% duplicative. The messaging policy may include an attachment rule stating that messages containing an attachment be displayed. If the 90% duplicative rule is predominant, despite the message having an attachment, it will not be displayed. Conversely, if the attachment rule is predominant, a message with an attachment will be displayed even if it contains more than 90% duplicative information. Therefore, the rules of the messaging policy may be ranked so that some rules take precedence over others. While the example demonstrates ranking of two messages, ranking may affect more, or possibly all of the rules in the messaging policy. Ranking may be performed by employing algorithms.

In some instances, displaying some duplicative data information may be preferred. For example, quoted text in the most recent message may be maintained to give the most recent message context because the most recent message may be hundreds of messages removed from the original message. However, as the message thread increases in size, the duplicative information may become inconvenient and overwhelm the message thread. One of ordinary skill in the art will recognize that some users may prefer to identify duplicative information in an email thread.

Example apparatus and methods perform deduplication to identify duplicative information that a user may consider redundant. Deduplication reduces redundant data by storing a single copy of data. Deduplication may involve dividing a larger piece of data into smaller pieces of data. Larger pieces of data may be referred to as "blocks" while the smaller pieces of data may be referred to as "subblocks" or "chunks". Dividing blocks into subblocks may be referred to as "chunking". For example, a message may be a block. The message may be chunked into subblocks consisting of groups of data (e.g., characters, words, phrases, sentences, paragraphs, code). Chunking may employ fixed size subblocks or variable size subblocks. Deduplication may include replication.

Unique subblocks are stored. As new subblocks are chunked, the new subblocks are compared to the unique subblocks in storage. New subblocks that are unique are stored as unique subblocks. New subblocks that are identified as having been previously stored are identified as containing duplicative information. There are many ways that a new subblock may be compared to previously stored subblocks. For example, a rolling hash that identifies subblock boundaries in variable length chunking may be used. While chunking and hashing are described, one of ordinary skill in the art will appreciate that other data deduplication approaches may be employed.

Example apparatus and methods may perform deduplication according to the messaging policy. For example, the messaging policy may compare subblocks using hash functions. If a subblock includes a large amount of data, the messaging policy may dictate that only a few specific features need to match for the subblocks to match. Furthermore, the messaging policy may determine how many subblocks have to match before an entire block is determined to have a match in storage.

The messaging policy may have varying degrees of strictness based on a user's preference. Users may select a degree of strictness based, at least in part, on the amount data the user wishes to be displayed in the message thread. A first degree messaging policy may have a low degree of strictness. Accordingly, a message may have to contain a significant amount of duplicative data before the message is considered to be duplicative. A low degree of strictness may also cause the majority of the rules associated with the first degree messaging policy to be permissive to displaying messages. Thus, different numbers of messages may qualify to be displayed in the message thread.

A second degree messaging policy may be stricter than the first degree messaging policy. A message may have to contain only a small portion of duplicative data before the message is considered to be duplicative. The second degree messaging policy may be generally prohibitive to displaying messages. Thus, few messages may qualify to be displayed. Therefore, a user may be able to choose between multiple messaging policies. The user may choose how data is deemed unrelated or redundant to reduce the amount of data displayed in the message thread. Accordingly, the data in the message thread is reduced to a user-defined level.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
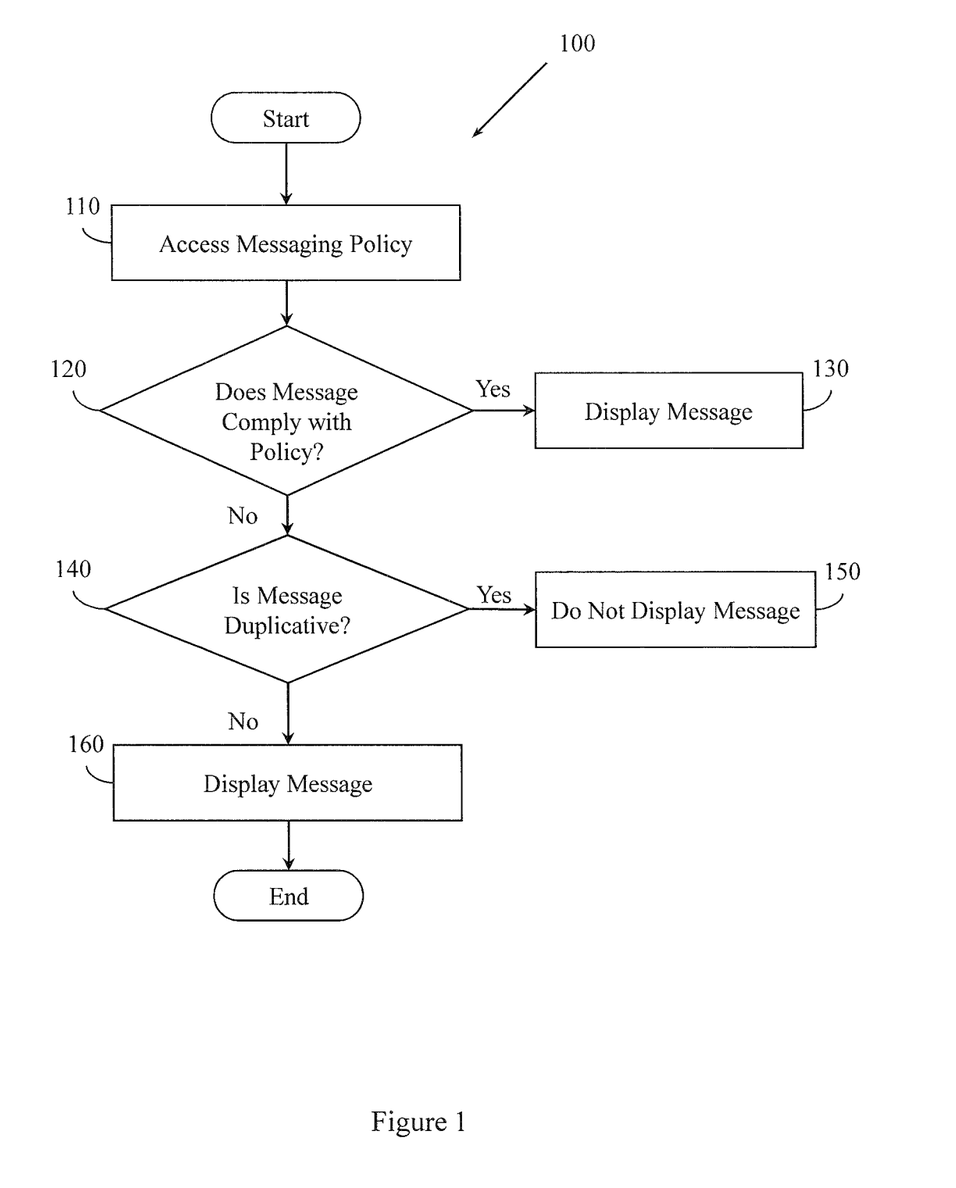
FIG. 1 illustrates a method associated with a messaging policy controlled email deduplication.

FIG. 1 illustrates a method 100 associated with a messaging policy controlled email deduplication. Method 100 includes, at 110, accessing a messaging policy. A messaging policy includes at least one rule pertaining to the presentation messages in a message thread. A message thread is a plurality of organized messages. The messaging policy may affect at least one message in the message thread or affect the message thread as a whole.

At 120 it is determined if the message should be displayed based on the rules of the messaging policy. If a message complies with the messaging policy at 120, it is displayed at 130. At 120, it may be determined that a message complies with the messaging policy because the message conforms to rules associated with the messaging policy. If it is determined that a message does not comply with the messaging policy at 120, it is then determined whether the message is duplicative at 140. At 140, data deduplication is used to determine whether the message is duplicative.

Data deduplication, at 140, can be performed a number of ways. The messaging policy may determine how data deduplication is performed. The data and metadata can be compared to other messages in the thread. The messaging policy may compare the subblock from a message to the previously stored subblocks for other messages in the thread. If a predetermined number or percentage of the subblocks from the message match previously stored subblocks, then the message is determined to be duplicative. Alternatively, if groups of subblocks match groups of previously stored subblock, then a portion of the message may be considered duplicative.

If, at 140, the message is determined to be duplicative, it is not displayed at 150. Conversely, if the message is not deemed duplicative at 140, the message is displayed at 160. Alternatively, if only a portion of the message is deemed duplicative, then that portion of the message may be deemed duplicative and that portion may not be displayed. In a different embodiment, the message may be displayed on a display screen (e.g., monitor, view screen, projection) or as a hard copy. In addition to selectively determining whether a message is to be displayed, example apparatus and methods may determine that unrelated or redundant data should be placed in a secondary thread, reorganized in an alternative folder, or even deleted. One of ordinary skill in the art will recognize that unrelated or redundant data can be dealt with a number of ways.

Figure 2:
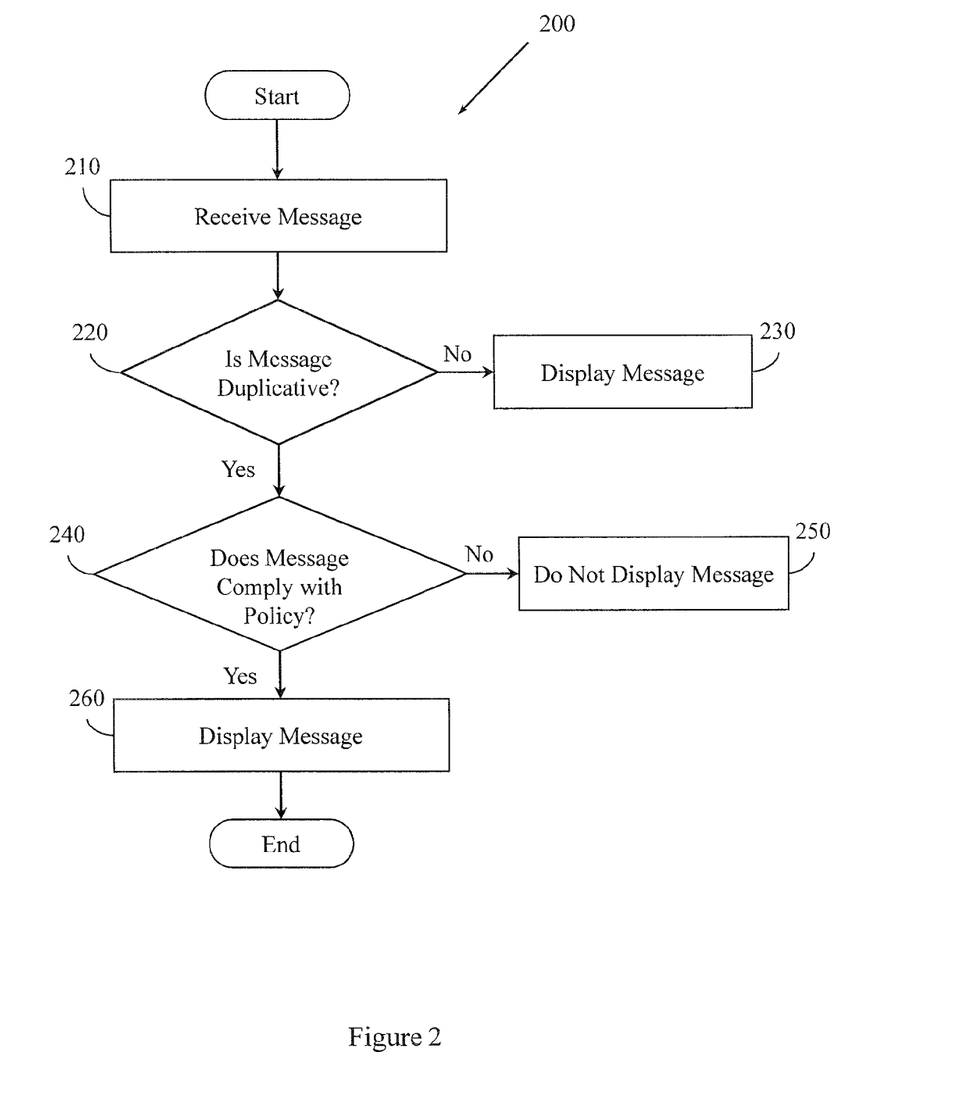
FIG. 2 illustrates a method associated with a messaging policy controlled email deduplication.

FIG. 2 illustrates a method 200 associated with messaging policy controlled email deduplication. Method 200 includes, at 210, receiving a message in a message thread. The message may be of types including, but not limited to, an email message, a forum message, or a digital message. At 220, it is determined whether the message is duplicative. Deduplication may be used to determine if the message is duplicative. If the message is not duplicative, the message is displayed at 230. If it is determined that the message should be displayed because the message does not contain duplicative information, then the messaging policy does not need to be accessed. Making an initial determination to display a message based on the amount of duplicative information in the message may save processing power and increase processing speed.

If the message is determined to contain duplicative information, it may be displayed if it complies with the rules set forth in the messaging policy. At 240, it is determined whether the message complies with the rules of the messaging policy. The rules in the messaging policy may deal with a data aspect or a metadata aspect of the message. If the rules determine that the message does not comply with the messaging policy, then the message is not displayed at 250. If instead it is determined that the message does comply with the messaging policy at 240, then the message is displayed at 260.

Figure 3:
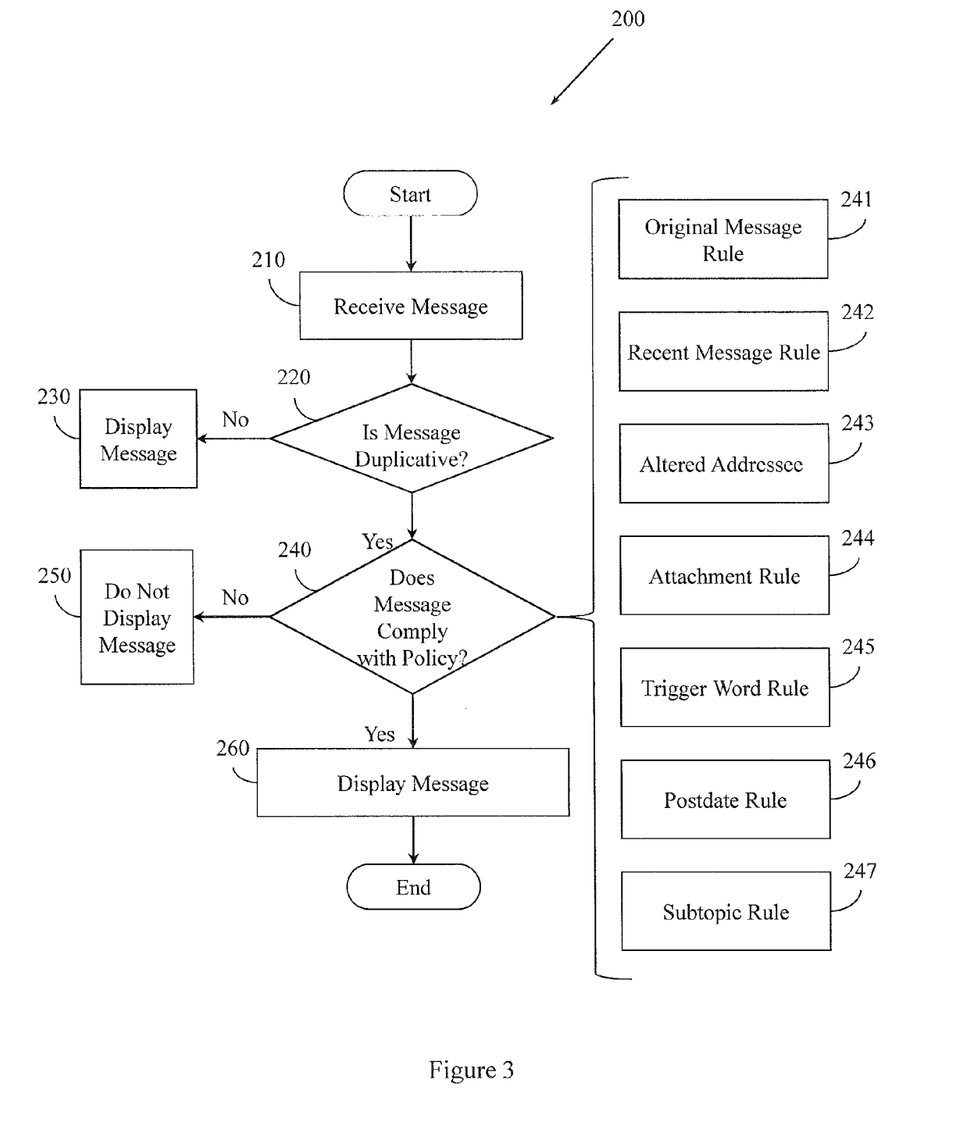
FIG. 3 illustrates additional detail for a method associated with a messaging policy controlled email deduplication.

FIG. 3 illustrates additional detail for one embodiment of the method 200. In this embodiment, determining whether a message complies with a messaging policy at 240 may include one or more of a plurality of rules. The rules may include, but are not limited to, an original message rule 241, a recent message rule 242, an altered addressee rule 243, an attachment rule 244, a trigger word rule 245, a postdate rule 246, and a subtopic rule 247. One of ordinary skill in the art will understand that these are example rules and other rules may also be included. The rules may be standard for a system or may be customized.

The rules in the messaging policy concern aspects of the message's data, the message's metadata, or a combination of both. For example, the original message rule 241 may dictate that the original message in a message thread is to be displayed. The recent message rule 242 may dictate that the most recent message is to be displayed. The altered addressee rule 243 may dictate that if addressees have been added, altered, or removed from a message as compared to the original message, the message is to be displayed. The attachment rule 244 may dictate that messages with attachments are to be displayed. The trigger word rule 245 may dictate that messages containing certain words in the text be displayed.

The original message rule 241, the recent message rule 242, the altered addressee rule 243, the attachment rule 244, and the trigger word rule 245 are examples of positively stated rules (e.g., rules that result in the message being displayed). Messages may also be negatively stated (e.g., rules that result in the message not being displayed). For example, the postdate rule 246 may dictate that a message received after a specified date is not to be displayed in the message thread. Additionally, rules may be stated positively or negatively with an exception.

The postdate rule 246 may conflict with the original message rule 241. Accordingly, the postdate rule 246 may have an exception that the postdate rule does not apply to the original message. Alternatively, the rules may be ranked to ensure that rules work in tandem to produce the desired result. The original message rule 241 may be ranked more highly than the postdate rule 246. Therefore, even if both rules apply the original message, the original message rule may take precedence. Like the rules, exceptions and rankings may be standard (e.g. default rules) or customized. A user may employ the rules to generate a personalized reduction of unrelated and redundant data from the message thread.

The subtopic rule 247 may be used to recognize branched threads that relate to a subtopic or alternate topic than the topic of the original message. The subtopic rule 247 may dictate that messages that deal with the original topic may be displayed, messages that include a subtopic but mainly deal with the original message may be displayed, and messages that deal mainly with a subtopic may not be displayed. The determination of whether the message deals with the original topic or a subtopic may be based on, for example, the number of times the at least one specific word is used, the addressor of the message, or the subject of the message.

If rule 247 deems a message to contain a subtopic or an alternate topic, in addition to the message not being displayed, the message may be marked to indicate that it contains a subtopic or alternate topic. Messages marked in this manner may be placed in a secondary thread or alternative folder. Marked messages may additionally be marked for deletion or marked as spam. Therefore, example apparatus and methods may go beyond determining whether a message is to be displayed.

FIG. 3 illustrates a number of rules that may or may not be used by a messaging policy. While only one rule may be used, it is likely that a number of rules will be used in conjunction with one another. In one embodiment, a message may only need to comply with a single rule to be displayed. Alternatively, a message may need to comply with a critical mass of rules to be displayed. For example, a message may need to comply with a predetermined percentage of the rules to be displayed. The rules may not be considered equally when determining if a message complies with the messaging policy. For example, compliance with a first rule may be enough for a message to be displayed, while compliance with a second rule may not be enough for a message to be displayed. However, compliance with the second rule and a third rule may be enough for a message to be displayed. Therefore, the rules may work independently or dependently to determine whether the message should be displayed.

Figure 4:
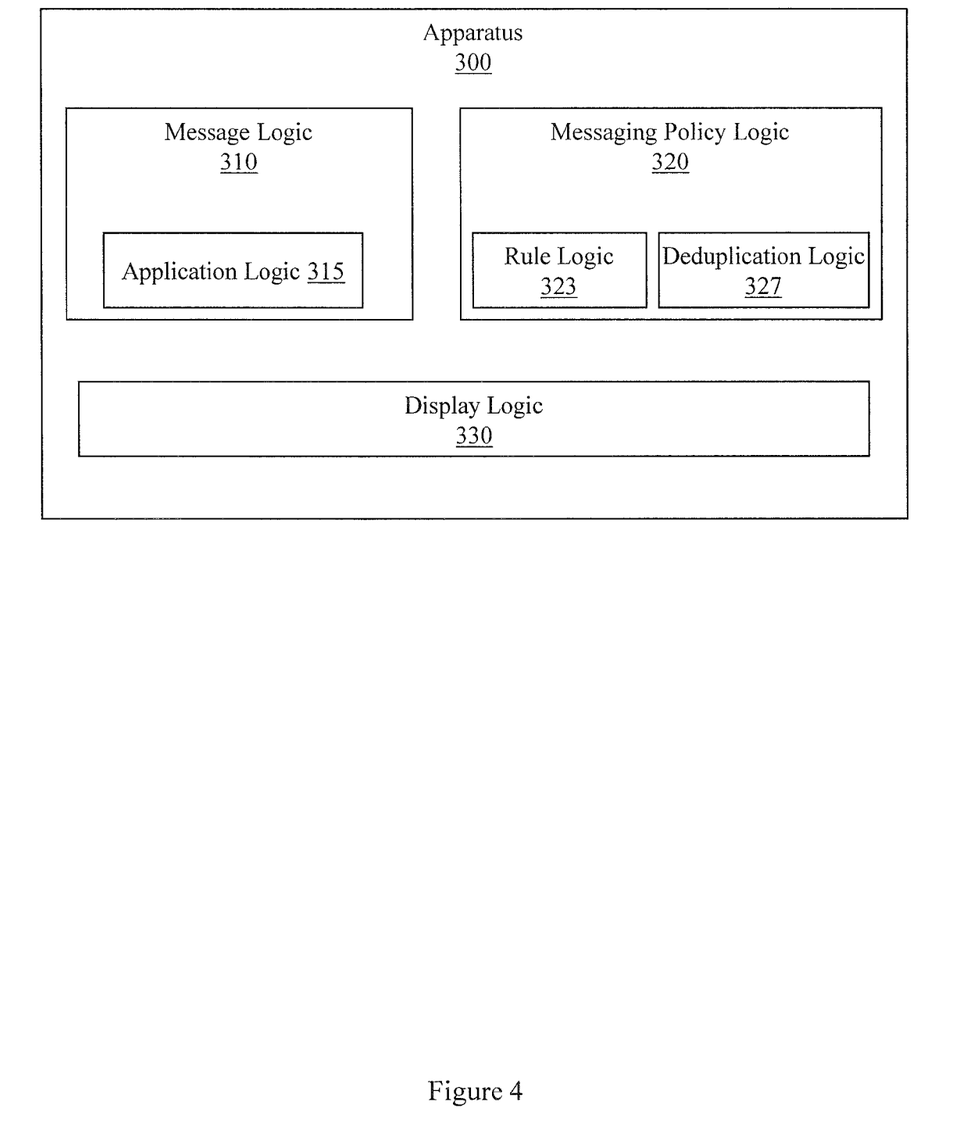
FIG. 4 illustrates an apparatus associated with a messaging policy controlled email deduplication.

FIG. 4 illustrates an apparatus 300 associated with a messaging policy controlled email deduplication. Apparatus 300 includes a message logic 310, a messaging policy logic 320, and a display logic 330. Apparatus 300 may also include a processor, a memory, and an interface configured to connect the processor, the memory, and the logics.

The message logic 310 may be configured to receive messages in a message thread. The message logic 310 may also be configured to process message threads as a whole. Additionally or alternatively, the message logic 310 may be configured to process messages as they are received and prior to the message being added to a message thread. The message logic 310 may be configured with an application logic 315. The application logic 315 may be configured to operate in conjunction with messaging programs to facilitate interaction between the apparatus 300 and a messaging program.

The messaging policy logic 320 is configured to determine whether a message is disqualified from being displayed. The messaging policy logic 320 is configured with a rule logic 323 and a deduplication logic 327. The rule logic 323 is configured to determine if a message complies with a messaging policy. The rule logic 323 may contain one or more rules that qualify a message to be displayed or disqualify a message from being displayed. In one example the rule logic 323 is programmable by a user to generate, alter, and delete rules.

The deduplication logic 327 is configured to determine whether a message includes duplicative information. The deduplication logic 327 is configured with information on how to perform deduplication. Further, the deduplication logic 327 is configured to determine whether a message is duplicative based on the amount duplicative information in the message. The deduplication logic 327 may be configured to determine what portion, if any, is duplicative. The messaging policy logic 320 is configured to use information from the rule logic 323, the deduplication logic 327, or both the rule logic 323 and the deduplication logic 327 to determine whether to display the message.

Display logic 330 is configured to display messages that the messaging policy logic 320 qualifies to be displayed. In different embodiments, messages may be displayed on a display screen, monitor, or projector. One of ordinary skill in the art will recognize that there are numerous ways that qualified messages can be displayed. In addition to displaying qualified messages, the display logic 330 may determine how to deal with disqualified messages. Disqualified messages may be placed in a secondary thread, reorganized in an alternative folder, or even deleted.

In one embodiment, apparatus 300 may provide a means for organizing a set of messages in a message application. Apparatus 300 may also provide a means for selectively displaying a subset of the set of messages based, at least in part, on compliance with a messaging policy having rules, and a means for selectively removing a member of the subset based, at least in part, on data deduplication. The means may include, for example, a set of logics. One of ordinary skill in the art will appreciate that in different embodiments, the logics may be computerized hardware or electronic circuits.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

While example apparatus, methods, and computer-readable media have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory, computer-readable medium storing computer-executable instructions that when executed by a message deduplication apparatus, control the message deduplication apparatus to perform a method, the method comprising:
    accessing a messaging policy, where the messaging policy compares subblocks using hash functions;
    upon determining that a message in a message thread complies with the messaging policy, displaying the message in the message thread; and
    upon determining that the message does not comply with the messaging policy and that the message does not contain information present in the message thread, displaying the message in the message thread;
    upon determining that the message does not comply with the messaging policy and that the message contains information present in the message thread, not displaying the message in the message thread,
    where determining whether the message contains information present in the message thread is performed using data deduplication,
    where the data deduplication reduces redundant data by storing a single copy of data, where the data deduplication involves chunking the message into subblocks consisting of groups of data, where as new subblocks are chunked the new subblocks are compared to unique subblocks in storage, where new subblocks that are unique are stored as unique subblocks and where new subblocks that are identified as having been previously stored are identified as containing duplicative information.

2. The non-transitory, computer-readable medium of claim 1, where the data deduplication is controlled by the messaging policy.

3. The non-transitory, computer-readable medium of claim 1, where the message is one of, a posting to a forum, an email message, a computer system message, and a text message.

4. The non-transitory computer-readable medium of claim 1, where the messaging policy comprises at least one rule.

5. The non-transitory computer-readable medium of claim 4, where the at least one rule has an exception.

6. The non-transitory computer-readable medium of claim 1, where the messaging policy includes a plurality of rules, and where at least two rules of the plurality of rules are ranked.

7. The non-transitory computer readable medium of claim 1, where the data deduplication analysis comprises comparing hash values for subblocks chunked from the message.

8. The non-transitory computer-readable medium of claim 1, where the messaging policy includes a plurality of rules, and where a first rule is dependent on a second rule.

9. A message de-duplication apparatus, comprising:
a processor;
a memory;
a set of logics; and
an interface configured to connect the processor, the memory, and the set of logics,
the set of logics comprising:
a message logic configured to receive a message;
a messaging policy logic configured to determine if the message satisfies a messaging policy; and
a display logic configured to display the message based, at least in part, on whether the message satisfies the messaging policy,
where the messaging policy logic comprises:
a rule logic configured to apply at least one rule to the message; and
a deduplication logic configured to perform data deduplication for the message, where performing data deduplication for the message includes at least one of determining that unrelated or redundant data should be placed in a secondary thread, determining that unrelated or redundant data should be reorganized in an alternative folder, determining that unrelated or redundant data should be deleted, or reducing redundant data by storing a single copy of data,
where the data deduplication logic chunks the message into subblocks consisting of groups of data, where as new subblocks are chunked the new subblocks are compared to unique subblocks in storage, where new subblocks that are unique are stored as unique subblocks and where new subblocks that are identified as having been previously stored are identified as containing duplicative information.

10. The message de-duplication apparatus of claim 9, where the message logic comprises an application logic to interface with messaging applications.

11. The message de-duplication apparatus of claim 9, where the at least one rule is one or more of, an original message rule, a recent message rule, an altered addressee rule, an attachment rule, a trigger word rule, a postdate rule, and a subtopic rule.

12. The message de-duplication apparatus of claim 9, where the rule logic is configured to apply a plurality of rules, and where at least two of the rules are ranked.

13. The message de-duplication apparatus of claim 9, where the rule logic is configured to apply a plurality of rules, and where at least two rules of the plurality of rules are ranked.

14. The message de-duplication apparatus of claim 9, where the at least one rule of the rule logic has an exception.

15. The message de-duplication apparatus of claim 9, where the deduplication logic is configured to perform deduplication by comparing a message subblock to a previously stored subblock using a chunk and hash approach.

16. The message de-duplication apparatus of claim 9, where the display logic is configured to remove the message from the message thread based, at least in part, on whether the message satisfies the messaging policy.

17. The message de-duplication apparatus of claim 10, where the deduplication logic is configured to determine if a portion of the message contains duplicative information.

* * * * *

UNITED STATES PATENT AND TRADEMARK OFFICE
CERTIFICATE OF CORRECTION

Page 1 of 1

PATENT NO. : 8,898,240 B2
APPLICATION NO. : 13/210590
DATED : November 25, 2014
INVENTOR(S) : Roderick B. Wideman It is certified that error appears in the above-identified patent and that said Letters Patent is hereby corrected as shown below:

In the Specification:

In column 3, line 16, delete "amount data" and insert --amount of data--.

In column 4, line 34, delete "subblock," and insert --subblocks,--.

In column 5, line 47, delete "apply the" and insert --apply to the--.

In column 6, line 54, delete "amount duplicative" and insert --amount of duplicative--.

In the Claims:

In column 10, line 38, delete "claim 10" and insert --claim 9--.

Signed and Sealed this
Twenty-fourth Day of March, 2015

Michelle K. Lee
*Director of the United States Patent and Trademark Office*